United States Patent [19]

Amberkar

[11] 4,166,144
[45] Aug. 28, 1979

[54] ELECTROSENSITIVE METALIZED LABEL STOCK

[75] Inventor: Suresh D. Amberkar, Framingham, Mass.

[73] Assignee: Dennison Manufacturing Company, Framingham, Mass.

[21] Appl. No.: 949,169

[22] Filed: Oct. 6, 1978

[51] Int. Cl.² .................. G01D 5/12; G09F 3/10; B32B 15/12
[52] U.S. Cl. .................................... 428/40; 428/43; 428/457; 428/464; 283/21; 346/150; 346/153
[58] Field of Search .................................... 428/40–43, 428/464; 346/150, 153; 101/426; 156/268, 275; 283/21; 40/2 R; 206/620

[56] References Cited

U.S. PATENT DOCUMENTS

| | | | |
|---|---|---|---|
| 2,304,787 | 12/1942 | Avery | 156/268 X |
| 3,265,524 | 8/1966 | Echeagaray | 428/464 X |
| 3,299,433 | 1/1967 | Reis | 346/150 |
| 3,383,121 | 5/1968 | Singer | 283/21 |
| 3,411,948 | 11/1968 | Reis | 428/464 X |
| 3,464,883 | 9/1969 | Moline et al. | 428/43 X |
| 3,758,336 | 9/1973 | Reichle | 346/150 X |

Primary Examiner—George F. Lesmes
Assistant Examiner—Alexander S. Thomas
Attorney, Agent, or Firm—George E. Kersey

[57] ABSTRACT

A design for a metallized electrosensitive label stock, and similar die-cut substrates for electrothermal printing. Imprinting occurs when an image-bearing stylus at a given potential contacts one portion of the substrate's metallized surface, while a grounded member contacts a nearby surface area. The flow of current between the stylus and ground causes a selective melting of the label's surface, revealing a colored undercoat. The labels are die-cut from a label stock in such a pattern as to allow proper current flow while permitting the proper removal of labels.

3 Claims, 3 Drawing Figures

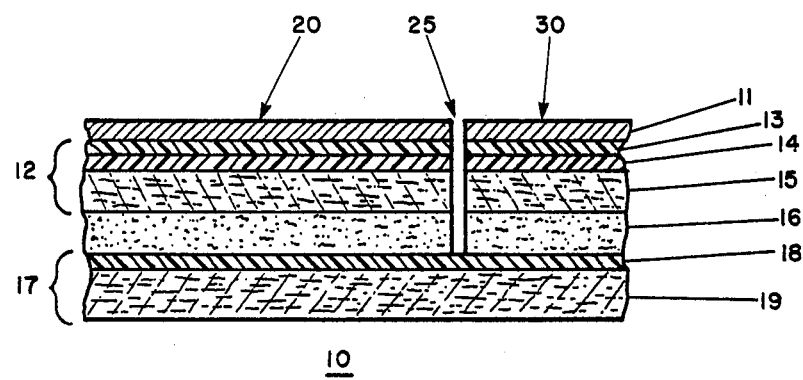
FIG. IA
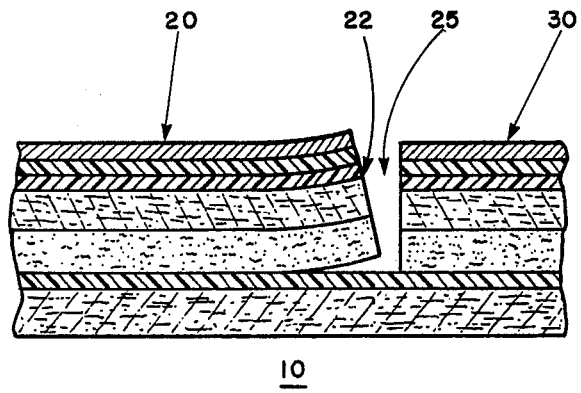
FIG. IB

ELECTROSENSITIVE METALIZED LABEL STOCK

BACKGROUND OF THE INVENTION

The present invention relates to the printing of electrosensitive substrates, and more particularly to the advantageous design of electrosensitive label stock.

Electrosensitive papers are widely used as a printing substrate, with the advantages of high printing speeds at reasonable costs. Such substrates are typically composed of an electroconductive paper with a thin metallic overcoat. Printing occurs when a stylus bearing a desired image is brought into contact with the metallic surface layer, and a potential difference is applied between the stylus and a grounded member contacting a nearby portion of the conducting substrate. The resulting current flow is largely converted into heat at the vicinity of the stylus, resulting in a melting of the metallic layer and patterned exposure of the differently colored underlayer. This technique, however, has never heretofore been extended to the imprinting of label stock and similar, die-cut substrates.

Accordingly, it is a principal object of the invention to design label stock and other die-cut electrosensitive substrates which are amenable to imprinting by the method described above. Another object of the invention is that such label stock possess the requisite properties to permit proper removal of imprinted labels.

SUMMARY OF THE INVENTION

In furthering the above and related objects, the electrosensitive metalized label stock of the invention comprises an array of labels which are cut from label stock in a pattern suitable for electrothermal imprinting, while allowing easy and trim removal of labels.

In accordance with one aspect of the invention, an array of labels are die-cut from label stock, and separated by a label border strip. In accordance with a related aspect of the invention, the labels are separated from the label border strip by a die-cut gap which is interrupted by bridges between the labels and label border strip. In accordance with another aspect of the invention, the number and width of the bridges is sufficient to allow the flow of current during imprinting without significant danger of fusing at the bridges. In accordance with a related aspect of the invention, the above may be accomplished by fewer bridges of greater width.

In accordance with a further aspect of the invention, the width and location of the bridges is chosen to minimize the problems of delamination and jagged edges in removing labels.

In accordance with a specific embodiment of the invention, for an illustrative label of 1"×3⅓", there are uninterrupted cuts or gaps at the ends of labels, and approximately nine bridges of ⅛" width or somewhat narrower, on each side of the label (18 bridges in all).

BRIEF DESCRIPTION OF THE DRAWINGS

The above and additional aspects of the invention will be apparent with reference to the detailed description which follows, taken in conjunction with the drawings in which:

FIG. 1A is a partial cross-sectional view of electrosensitive metalized label stock.

FIG. 1B is a view of the label stock of FIG. 1A, with the label partially removed.

DETAILED DESCRIPTION

Figure 2:
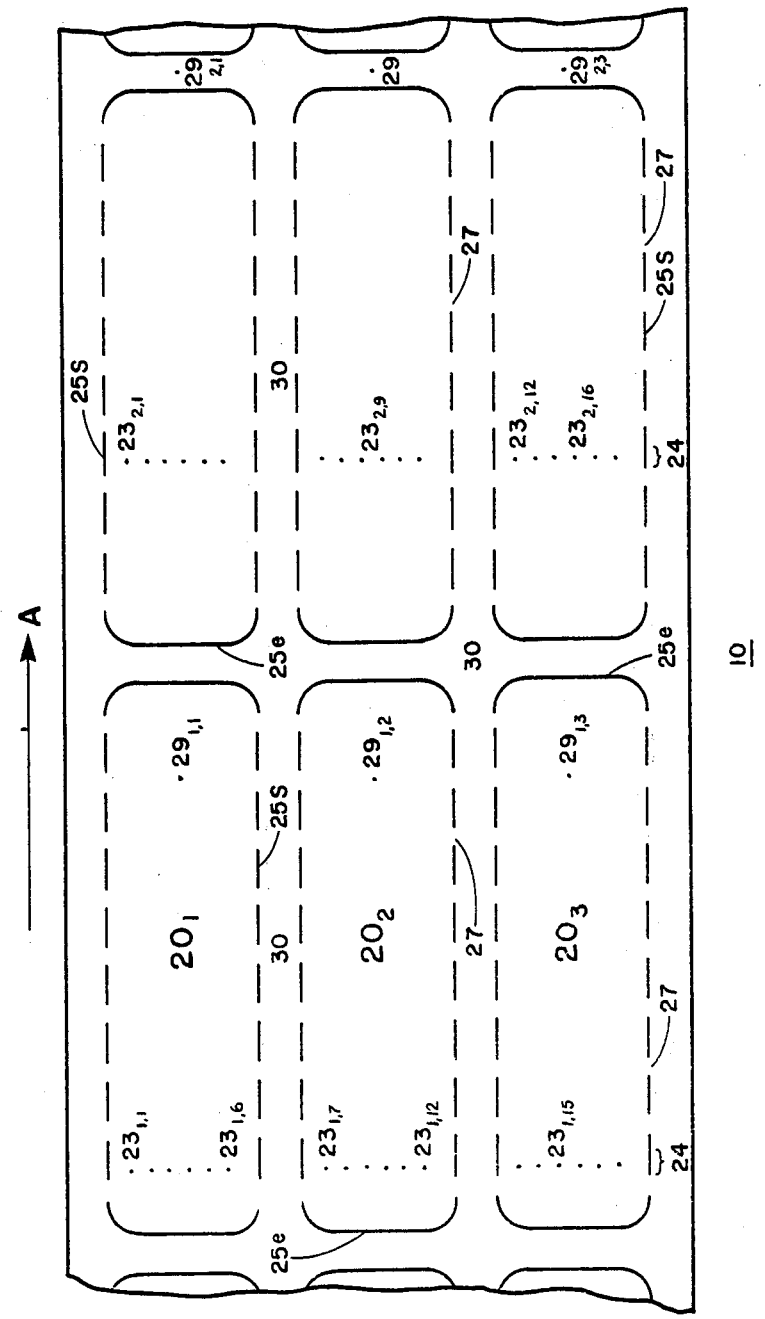
FIG. 2 is a partial plan view of label stock in accordance with a preferred embodiment of the invention.

Reference should now be had to FIGS. 1 through 2 for a detailed description of the electrosensitive label stock of the invention.

The partial sectional view of FIG. 1A shows the various layers of an illustrative label stock 10. Label stock 10 includes a label 20 and a label border strip 30 adhering to a release sheet 17, with a gap 25 separating the label from the label border strip. The label 20 and label border strip 30 are each composed of a pressure-sensitive adhesive layer 16, electrosensitive paper 12, and a thin, metallic overcoat 11 (such as aluminum). The electrosensitive paper 12 in turn comprises an electroconductive label base material 15, a tie coat 14, and a colored lacquer coating 13. Indicia are produced in label 20 by selectively melting metallic layer 17 to expose colored layer 13.

As shown in FIG. 1B, a label 20 is removed from release sheet 17 by peeling the label, including pressure-sensitive adhesive 16, from the release surface 18. To minimize the risk of delamination of the label 20, and avoid a jagged edge 22 of the separated label, it is advisable to precut a pronounced gap 25 between label 20 and label border strip 30. To the extent that the gap 25 is interrupted by regions of contact between label 20 and border strip 30, the above label removal problems will be increased.

FIG. 2 is a partial plan view of a web of label stock 10 in accordance with a preferred embodiment of the invention. Label strip 10 illustratively comprises a 3×N array of labels 20 separated by a border strip 30. As label stock 10 moves through an imprinter in direction A, a row of conducting stylii bearing desired indicia contacts three adjacent labels, while a metal roller contacts label strip 20 at a nearby location. For proper imprinting of labels, there must be an uninterrupted current path between the point of contact of a given stylus, at potential V, and the grounded metal roller.

With reference to FIG. 2, when the imprinting stylii are at row $24_1$, a grounded roller contacts the label $20_2$ at point $29_1$. A current path exists between stylus $23_{1,7}$ and roller $29_2$, both located within label $20_2$. When the stylus row is at location $24_2$, however, the stylii are located within labels $20_4$, $20_5$, and $20_6$, while the grounded rollers contact label border strip 30. In this particular printing configuration, the essential current flow is interrupted by gap 25 between the labels 20 and border strip 30.

In order to assure proper current flow for imprinting purposes, therefore, it is necessary to interrupt gaps 25 with bridges 27 connecting the labels 20 with border strip 30. The number and length of these bridges preferably should be such to ensure a proper current flow while not overly interferring with the removal of labels 20. If the bridges are too short or too few in number, they may act as fuses when subjected to a high current flow during imprinting of a full row of indicia. In this case, the high current density at the bridges will cause the vaporization of the label material at those points. On the other hand, if the bridges are too long or poorly located, it will be very difficult to remove the labels without delamination or jagged edges.

The label stock of FIG. 2 incorporates a preferred gap-bridge configuration which presents an effective compromise between the above considerations. At each end of a given label 20, there is an uninterrupted gap 25e, which provides a good starting point for the peeling of that label from the label stock. At the two sides of the label, there are approximately nine short bridges 27 which are periodically spaced along the label's edge. Illustratively, for a 1"×3½" label, these bridges are roughly ⅛ of an inch in length, or perhaps somewhat shorter. With fewer bridges of this length, there will be significant increase of the risk of fusing. An acceptable alternate is to provide fewer gaps of greater length, but this entails increased label removability problems.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

I claim:

1. Electrosensitive metalized label stock and the like, for electrothermal imprinting, comprising:
   a plurality of labels of electrosensitive metalized material;
   a border strip of electrosensitive metalized material surrounding said labels; and
   wherein said electrosensitive metallized material comprises an electroconductive paper coated with a thin metallic overcoat and;
   a releasable backing member bearing said labels and border strip;
   wherein each label is separated from said border strip by a gap which is interrupted by one or more bridges, said bridges being configured to allow the flow of current in electrothermal imprinting while permitting the removal of labels from said backing member.

2. Electrosensitive metalized label stock as defined in claim 1 wherein said labels are essentially rectangular with two ends and two sides, and wherein at each label no bridges interrupt the gap separating that label from the border strip at the end of the label.

3. Electrosensitive metalized label stock as defined in claim 2 wherein the gap at each side of a given label is interrupted by a series of narrow bridges, said bridges being on the order of ⅛" or less.

* * * * *